(12) United States Patent  
Condreva

(10) Patent No.: US 6,663,012 B2  
(45) Date of Patent: Dec. 16, 2003

(54) METHOD FOR DETECTING MOISTURE IN SOILS USING SECONDARY COSMIC RADIATION

(75) Inventor: Kenneth Condreva, Livermore, CA (US)

(73) Assignee: Sandia National Laboratories, Livermore, CA (US)

( * ) Notice: Subject to any disclaimer, the term of this patent is extended or adjusted under 35 U.S.C. 154(b) by 165 days.

(21) Appl. No.: 10/004,291

(22) Filed: Oct. 29, 2001

(65) Prior Publication Data

US 2003/0080199 A1 May 1, 2003

(51) Int. Cl.$^7$ .......................... B05B 17/00; A01G 25/00; A01G 27/00
(52) U.S. Cl. ..................... 239/63; 239/64; 239/67; 239/68; 239/69; 239/70; 239/1
(58) Field of Search .............................. 239/63, 64, 67, 239/68, 69, 70, 1; 250/361 R, 362, 363.01, 357.1; 700/284, 16

(56) References Cited

U.S. PATENT DOCUMENTS

| | | | | |
|---|---|---|---|---|
| 3,602,713 A | * | 8/1971 | Kastner et al. | ............ 250/392 |
| 3,843,887 A | * | 10/1974 | Morrison | ...................... 378/53 |
| 4,047,042 A | * | 9/1977 | Wada et al. | ........... 250/390.06 |
| 4,614,870 A | | 9/1986 | Morrison | ..................... 250/390 |
| 4,992,667 A | * | 2/1991 | Abelentsev et al. | ... 250/390.05 |
| 5,594,250 A | | 1/1997 | Condreva | ................... 250/361 |
| 6,076,740 A | * | 6/2000 | Townsend | ...................... 239/1 |
| 6,281,801 B1 | | 8/2001 | Cherry et al. | ............... 340/605 |

OTHER PUBLICATIONS

*Scintillation Spectroscopy of Gamma Radiation*; Stephen M. Shafroth, eds. pp. 54–60; Copyright 1967 Gordon and Breach Science Publishers. Inc., 150 Fifth Avenue, New York, NY; Library of Congree Catalog Card No. 66-28074.
*Radiation Shielding*; Price, B.T.; Horton, C.C.; Spinney, K.T. pp. 32–47; Copyright 1957, The Macmillan Company, New York, NY.
"Engineering and Design Selection of Methods for Soil Moisture Measurement" McPherson, J.A.; Department of the Army, Army Corps of Engineers Engineer Technical Letter No. 1110-2-323; Jun. 24, 1991; pp. 1–12.

* cited by examiner

*Primary Examiner*—Davis D Hwu
(74) *Attorney, Agent, or Firm*—Timothy P. Evans

(57) ABSTRACT

Water content in a soil is determined by measuring the attenuation of secondary background cosmic radiation as this radiation propagates through a layer of soil and water. By measuring the attenuation of secondary cosmic radiation in the range of 5 MeV–15 MeV it is possible to obtain a relative measure of the water content in a soil layer above a suitable radiation detector and thus establish when and how much irrigation is needed. The electronic circuitry is designed so that a battery pack can be used to supply power.

5 Claims, 6 Drawing Sheets

METHOD FOR DETECTING MOISTURE IN SOILS USING SECONDARY COSMIC RADIATION

STATEMENT OF GOVERNMENT INTEREST

The Government of the United States has rights in this invention pursuant to contract No. DE-ACO4-94AL85000 between the United States Department of Energy and the Sandia Corporation for the operation of the Sandia National Laboratories.

BACKGROUND OF THE INVENTION

The present invention relates generally to detecting an attenuation of secondary cosmic radiation passing through a given depth of soil as a means for determining the water content in the soil.

In many agriculture regions of the country knowledge of the water content in the surrounding soils is absolutely critical to the viability of agricultural enterprises in these areas. In particular, wine growing regions in the drier valleys of California may receive about 15 inches of precipitation a year. All of that total, however, comes as rain between the months of November through March after which virtually no rain falls for the remainder of the year. Irrigation is therefore essential to the sustainability of this crop. The cost of water, however, makes it just as essential to limit the amount of water applied to only that which is necessary for the health of the plant. Consequently, there has been a long felt need for a simple, inexpensive, reliable and practical method for determining these data. For these same reasons, any country whose agribusiness includes a segment which is water intensive or which utilizes arid and drought susceptible acreage would be interested in soil hydrology.

As the demand on water resources increases there is a corresponding need to automate more survey sites in order to measure more accurately the content of moisture in the soil in order to allocate resources appropriately: reliance upon core samples is too expensive and time consuming to provide much more than a periodic spot survey of water usage. As a result, a number of sensing technologies have been developed to provide this information. These are conveniently divided into five categories based on the physical principles on which each is derived. In particular, these are hygrometric, tensiometric, gravimetric, electromagnetic, and nuclear techniques and a useful summary of each of these is available in Engineer Technical Letter (ETL) No. 1110-2-323 (dated Jun. 24, 1991) by the U.S. Army Corps of Engineers.

Most of these techniques, however, provide soil moisture information that is limited to regions at or near the surface of the soil. What is needed instead is a system to provide subsurface measurements of the amount of water held in the intervening layer of soil. The exception to the techniques described above are various active and passive radioactive techniques for measuring the water content in soils and in snowpacks that have been reported in the literature. In particular, Abelentsev et al., in U.S. Pat. No. 4,992,667, disclose a method for simultaneous measurement of moisture in soils and in snowpacks utilizing fixed neutron detectors to monitor the attenuation in extraterrestrial or "cosmic ray" generated neutron radiation versus snow depth. In addition, the Applicant, in U.S. Patent Ser. No. 5,594,250, discloses using the attenuation of secondary cosmic gamma radiation by water molecules to determine the equivalent water content in a snowpack. Neither of these patents, however, disclose or suggest that it is possible to provide a measure of water suspended in a layer of soil above a detector by measuring the attenuation of secondary cosmic rays.

The present invention discloses method and a system for determining the water contained in a layer of soil across a cultivated field which, by measuring the attenuation of a wide spectrum of secondary cosmic radiation, has significant advantages over existing techniques.

SUMMARY OF THE INVENTION

The invention disclosed herein provides a new solution to the problem of measuring soil moisture at depths of more than a few feet, particularly in remote and widely dispersed locations. A method is described which permits a relative measurement of soil moisture using an apparatus which is practical and inexpensive, easy to install, requires little or no maintenance, and makes available data in "real time". The present invention measures the attenuation of secondary cosmic radiation, primarily gamma rays and muons, rather than extraterrestrial neutron radiation, or other active, terrestrial radiation sources to determine the moisture content of soils at varying depths below a cultivated field.

Cosmic radiation is a stream of ionizing radiation of extraterrestrial origin that enter the Earth's atmosphere consisting chiefly of protons, alpha particles, diminishing proportions of most other atomic nuclei of increasing mass through iron, and high-energy electrons. These high energy particles eventually collide with the atomic nuclei of air molecules in the upper atmosphere and generate a cascade of secondary radiation known as secondary cosmic radiation, as a consequence. These high energy collisions result in the production of neutral, charged pi mesons as well as high energy protons and neutrons (nucleons). The neutrally charged pi mesons decay almost immediately into gamma rays which in turn decay into electron-positron pairs which themselves lead to generations of gamma/electron-positron decay reactions, while the positively and negatively charged pi mesons decay into mu mesons and neutrinos, of which about 5% of the mu mesons, or "muons," reach ground level. The energetic nucleons (protons and neutrons) generate a cascade of successive nuclear decay reactions to produce successive generations of protons and neutrons having successively lower energies. Because of ionization losses as they progress through the atmosphere, however, the dominant form of nucleons reaching ground level are thermalized neutrons.

The overall result of these nuclear interactions is a shower of energetic particles at ground level made up principally of muons, neutrons, electrons and photons (gamma rays). In particular, the cosmic gamma radiation and muons can serve as a radiation source since it is known that for a given detector volume, the cosmic gamma ray flux is about 100 times greater than that for cosmic neutrons.

The invention described herein is directed to a method of remotely determining the relative content of water in a surrounding volume of soil at given soil depths. Accordingly, it is an object of this invention to use the attenuation of secondary cosmic radiation by water suspended in soil aggregates to determine the relative water content of those soils.

Another object of this invention is to perform this measurement remotely and transmit the data in real time.

This invention can be implemented with a detector such as a scintillator type radiation detector of the type used to provide a response to high energy particles and radiation. The scintillator and its associated instrumentation are intended to be located at several feet below the soil surface. As precipitation falls or as irrigation is applied water accumulates over time in the surrounding soil. The water content is determined by monitoring the decrease in secondary cosmic radiation intensity as the quantity of water in the soil increases. Where a scintillation type detector is used to detect secondary cosmic rays, a photodetection system and a pulse height analyzer are used to count the number of particles penetrating through the soil to reach the detector. A power supply coupled with a telemetry system for transmitting data from remote locations completes the instrument package. Because variations in the flux of cosmic radiation throughout the year can lead to errors in the determination of the water content of the soil, a second embodiment of this invention employs a second detector positioned above the surface of the soil to record these variations. The data received from the second detector may then be used to correct attenuation data. In another embodiment of this invention, a second scintillator of similar size can be placed directly below and contiguous with the primary detector to allow anti-coincident exclusion of false readings due to the high energy primary cosmic radiation. The inventor has determined that while secondary cosmic rays generally could be employed to perform the measurements described herein, there is a preferable energy range that is desired. The preferred energy range is from above about 5 MeV, and is high enough to measure soil moistures that could reasonably be expected to be encountered but low enough to make the detector size of practical dimensions.

The objects of the present invention together with additional objects, novel features and advantages thereof over existing prior art forms, which will become apparent to those skilled in the art from detailed disclosure of the present invention as set forth hereinbelow, are accomplished by the improvements herein described and claimed.

BRIEF DESCRIPTION OF THE DRAWINGS

The accompanying drawings, which are incorporated in and form part of the specification, illustrate the present invention and, together with the description, explain the invention.

DETAILED DESCRIPTION OF THE INVENTION

Figure 3:
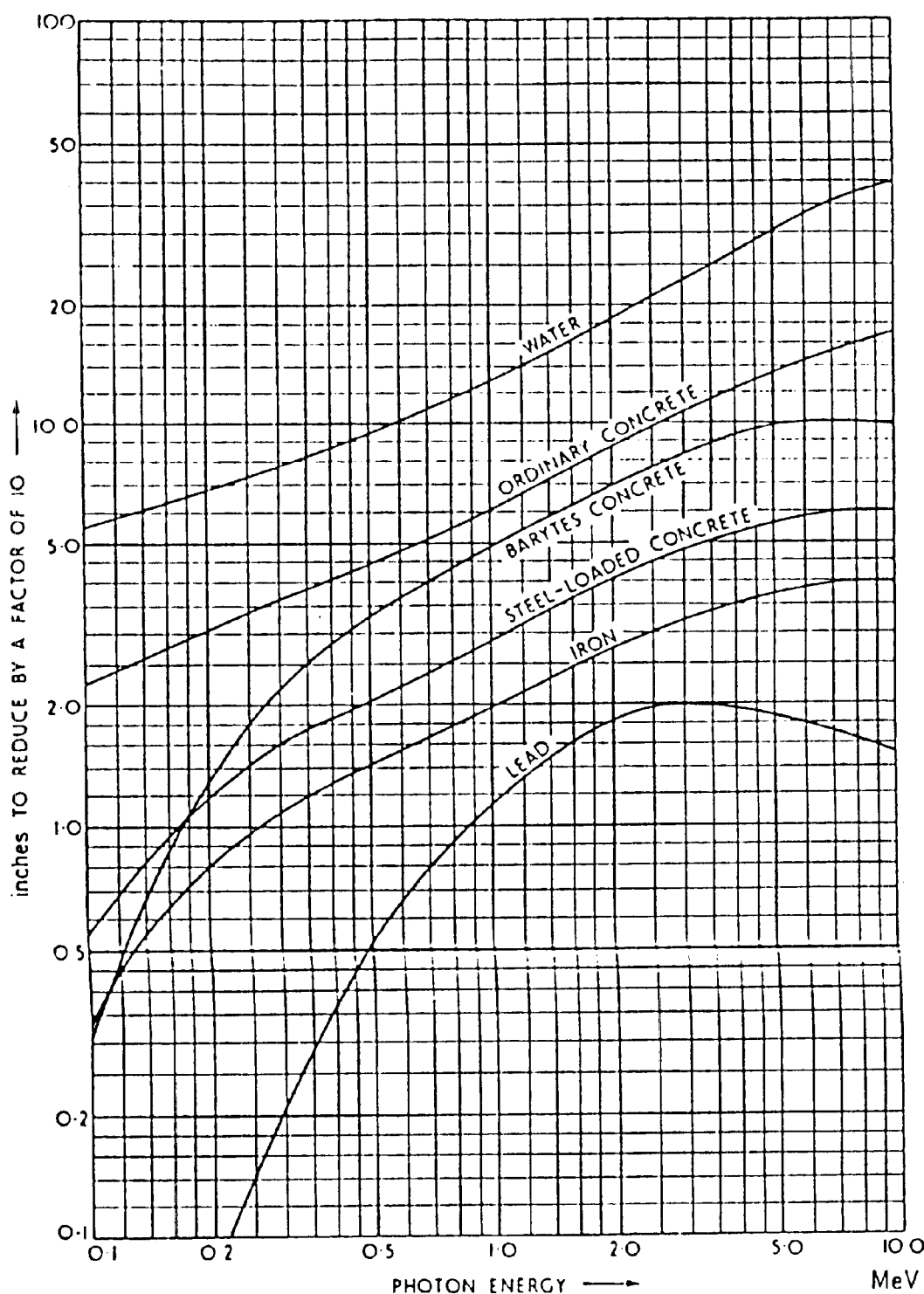
FIG. 3 shows the penetration distances in water and ordinary concrete required to reduce (attenuate) gamma rays having energies ranging from 0.1 MeV to 10 MeV by a factor of 10.

The method of measuring the quantity of water contained within a volume of earth as set forth in this invention is based on a relative measurement of the attenuation of secondary cosmic radiation by the water present in the soil. Moist soil is comprised of some fraction of water, air, and a distribution of rocky material, clays, and organic matter that is compacted loosely or tightly depending on factors such as depth and the relative fractional distribution of the soil constituent materials. The attenuation characteristics for gamma radiation (the length of material necessary to reduce the energy of a high energy photon by some multiple) for both water and concrete at a gamma ray energy of 0.1 MeV to 10 MeV is shown in FIG. 3. Since soil and concrete are comprised of similar materials with the exception of the fractional quantity of organic matter and air contained in the soil, one would expect soils to attenuate gamma radiation at a level falling somewhere between that of water and concrete. It is expected, therefore, that a layer of soil would provide some significant level of attenuation of the secondary cosmic ray flux, since a significant proportion of that flux at ground level comprises gamma rays. The actual amount of attenuation, however, is dependent upon the depth of the soil layer being penetrated, and the shielding effect of the soil on other constituent particles comprising the radiation flux. Furthermore, since the presence of moisture in the layer soil above the detector would manifest itself as an additional degree of attenuation and since the soil at some depth will never by completely "dry," the measurement relies on measuring changes in the detected flux of secondary cosmic radiation.

Although the presence of the soil will compromise the accuracy of this technique, the present invention provides advantages over prior art methods (conductivity probes, neutron probes) in that the existing techniques measure moisture only within a few feet of the soil surface. In a number of agricultural applications, however, such as viticulture and fruit tree production, knowledge of the moisture level at the root level many feet below the surface is desired. A deeply buried soil moisture probe device relying on secondary cosmic radiation solves this problem and also provides a measure of the moisture over a relatively wide area, which is another advantage over existing techniques.

Figure 1:
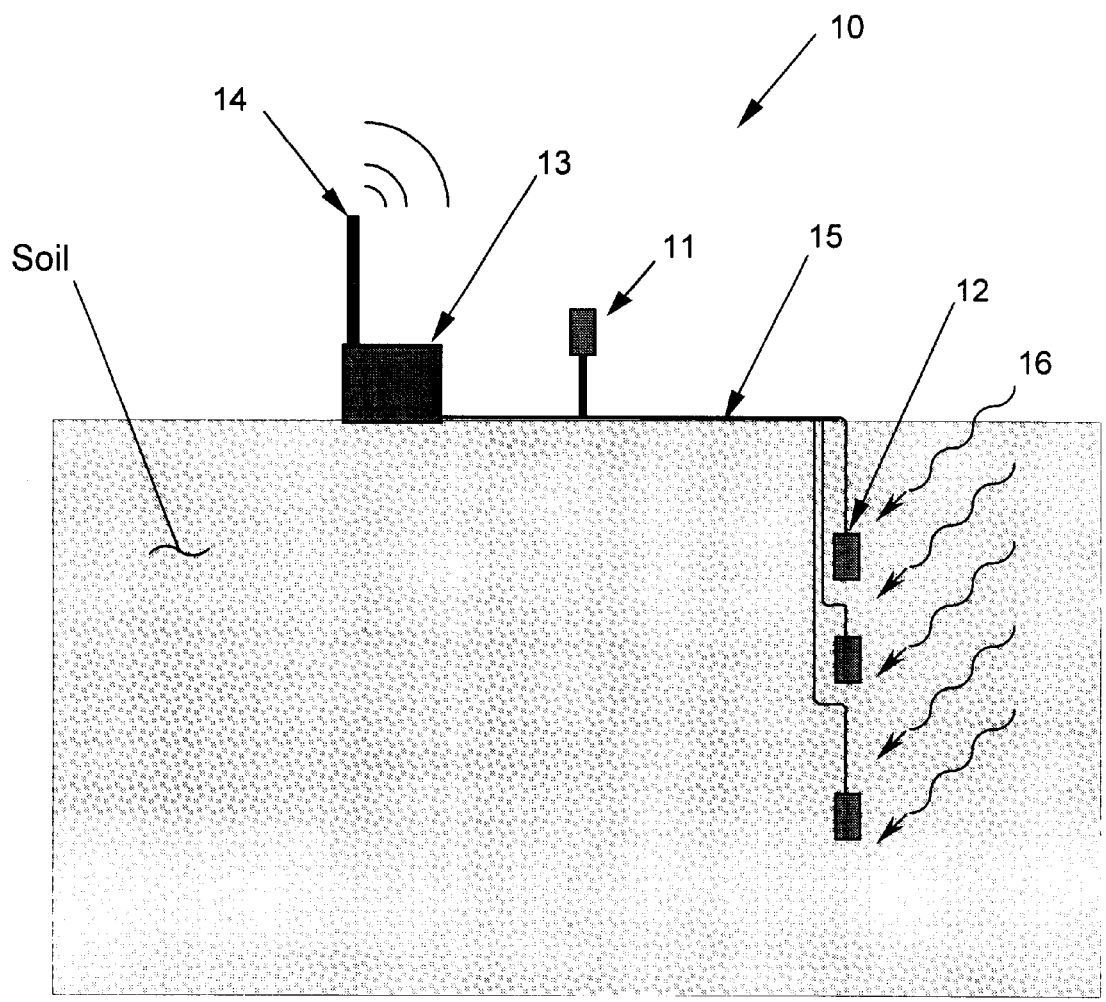
FIG. 1 is a diagram showing an arrangement of equipment used to measure attenuation of cosmic rays by water suspended in a layer of soil.
Figure 4:
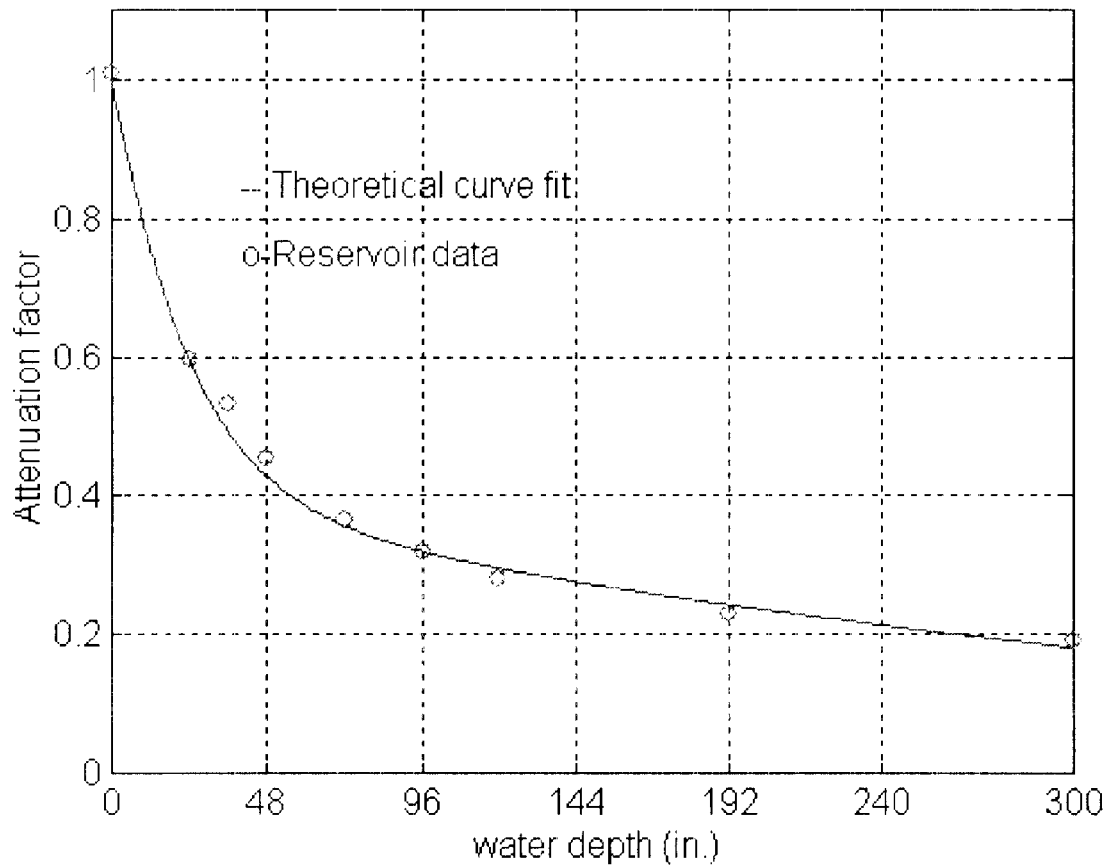
FIG. 4 shows the fractional count rate of background gamma radiation in the 5 MeV to 15 MeV range vs. depth in water using a 3 inch NaI scintillator detector.
Figure 5A:
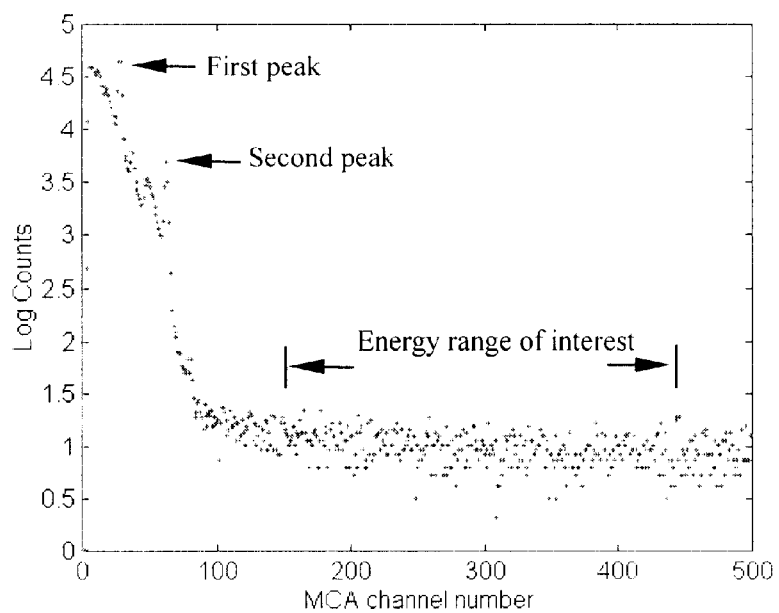
FIGS. 5A and 5B illustrate typical spectra from Field and Reference detectors respectively and show the energy range of interest for measuring the attenuation in the secondary cosmic radiation.
Figure 5B:
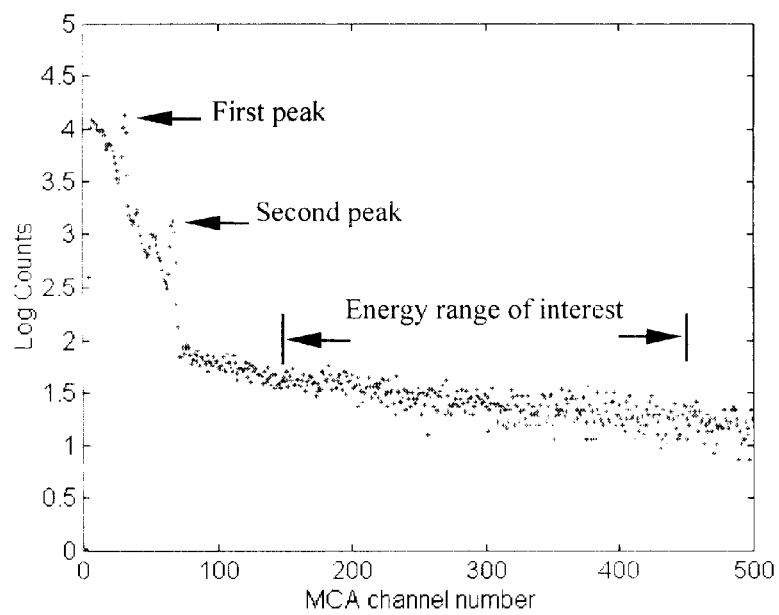

Because the present invention measures the attenuation of cosmic rays to determine the water content of a soil, it is first necessary to determine the attenuation characteristic for a "dry" soil. A curve similar to that shown in FIG. 4 would need to be developed in the soil of interest by comparing the radiation attenuation data to soil moisture data measured by some independent means, such as by core samples, under various soil moisture conditions. This would be done by measuring the radiation flux at ground level while simultaneously measuring the decrease in secondary background cosmic radiation as it passes through a layer of soil of known depth during the dry season. The detectors are adjusted to measure radiation between 5 MeV to 15 MeV as seen in FIG. 5. In this case, one or several Field Detectors are buried in soil at a known depth of interest, while a Reference Detector is mounted at or slightly above ground level as is depicted in FIG. 1 below.

Data is obtained by first finding two dominant background peaks in the spectra shown in FIG. 5 obtained from each detector. The position of these peaks provides a means for associating the channel numbers of the individual instruments used to measure and record the spectra of the radiation. The channels bounding the lower and upper energy range of interest for each detector is thereby determined providing a means for comparing the measurement results for each instrument. In the instant experiment, an energy range of 5 MeV to 15 MeV was used, although the technique is not limited to this specific range and any other range would be useful so long is it is well removed from the prior identified spectral peaks.

Each detected photon or high energy particle within this energy range is counted at each channel number and summed. The individually summed counts in each channel are taken from each of the several Field detectors and divided by the corresponding channel count taken from the Reference Detector during the same time interval. The result provides the attenuation ratio number discussed above and referred to in FIG. 4. By using this procedure it is not necessary to measure the temperature of each detector, since the resulting shift in the spectral peaks (brought about temperature differences) allows for adjusting the location of the energy range of interest for each detector and thus correct for temperature shifts.

During the dry season, detectors are placed in a field prepared for cultivation, both at the surface of the soil and at one or more known depths below the surface. This is repeated in an array pattern across the field under study (although only the buried detectors need be repeated). Measurements of secondary cosmic radiation incident at or near the ground level are made while a second set of measurements is taken simultaneously below ground in order to compare and normalize the subsurface measurements and thereby establish a baseline attenuated flux of secondary cosmic radiation at each measurement level in the soil. Once this baseline flux has been determined, the field is irrigated and changes in the secondary cosmic radiation are continuously measured as the water percolates through the soil.

As a known quantity of water is applied to the soil (assumed to be distributed uniformly) and allowed to seep through and "wets" the soil above the buried detectors, the volume of water migrating through the soil layer acts as an added radiation absorber. The stopping power of the water in the layer of soil above the detector should remain more or less constant until the leading edge of the percolating water passes the level of the detector. At this point the attenuation of the detected radiation begins to decrease continuously as the water percolates through the strata below the detector and wets more of the subsurface soil. This process continues until an equilibrium is established which balances the surface tension of the water and the capillary action of the soil or wherein some impermeable barrier is encountered such as a layer of clay. Therefore, as water is applied to the soil above the buried detector, secondary cosmic radiation would be expected to immediately decrease until the application of water is stopped. It is also expected that the amount of the decrease in measured radiation should be proportional to the amount of water applied and should remain fairly constant until the percolation zone passes the buried detector. At this point, absent further irrigation one would expect to see the detected radiation begin to increase once again as more water is drawn down further into the soil.

Since the amount of water applied to the field in acre-feet is known and the percolation rate of the soil can be determined, the relative water content in the soil could be compared to the measured attenuation of the secondary cosmic radiation caused by water held in the soil and thereby calibrate the detector should that be necessary. In any case, however, what is actually needed is a relative measurement to indicate whether or not the moisture content in the soil is maintained at an optimum level and a means for indicating when that level moves outside of a acceptable range, either above or below.

Figure 2:
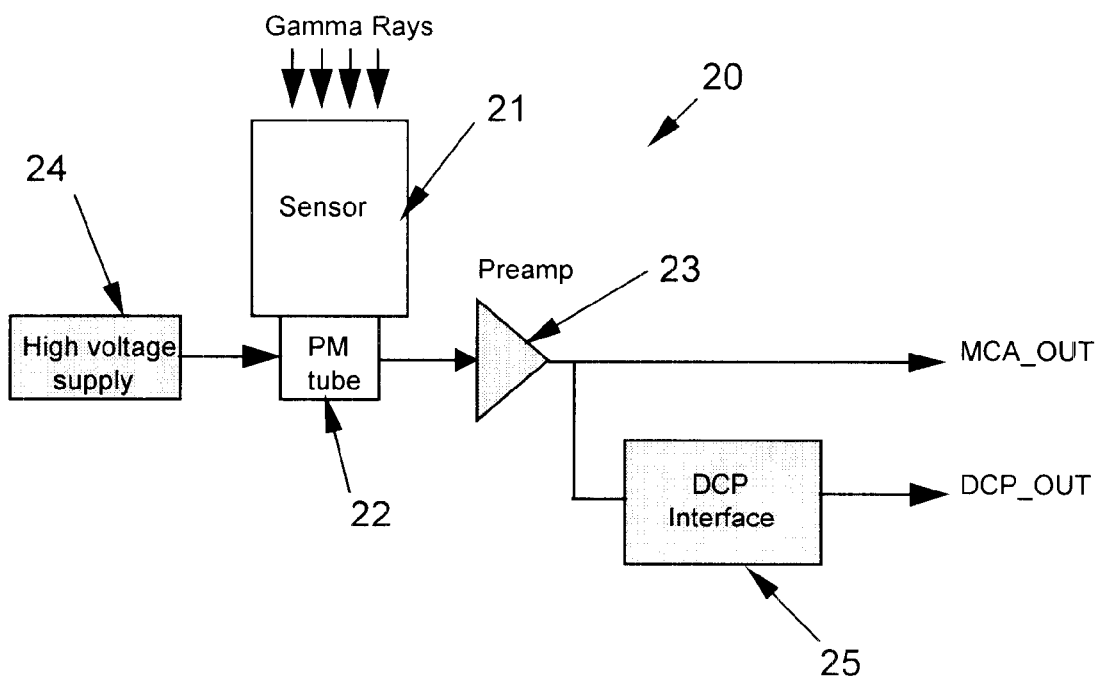
FIG. 2 is a block diagram of a cosmic ray measurement system suitable for field use in determining the water content of a soil layer.

A typical sensor block diagram is shown in FIG. 2 below. All blocks are typically found in commercial scintillation detectors, with the exception of the DCP Interface block. This circuitry is used to convert the number of detection events observed to occur within a specific energy range to a D.C. voltage proportional to the number of events counted. Since the Pre-amp output (MCA_OUT) of the detector typically varies with temperature, some form of temperature correction is necessary within the DCP Interface block in order to maintain "energy range" accuracy.

FIG. 1 illustrates a diagram of a best mode envisioned by the inventor for carrying out the invention. A cosmic ray measurement and data transmission system 10 suitable for determining water content at the site of interest is depicted in FIG. 1. System 10 consists of a ground level detector reference unit 11, one or more field detectors 12, sensitive to secondary cosmic rays 16, each individually connected to an interface electronics package 13 via data bus 15, and wherein interface package 13 contains circuitry for converting signals from the field detectors 12 into electrical pulses suitable for counting, and a power supply (not shown). In addition, field detectors 12, and ground reference detector 11 are connected to interface package 13 via data bus 15. An optional transmission antenna 14 may be installed on interface package 13 to provide for remote transmission of data from the field allowing periodic radio frequency transmission of the summed count data at various time intervals to a central data receiving station (not shown).

FIG. 2 shows a block diagram of a secondary cosmic ray detection system suitable for use in the field. The unit may consist of a large diameter (3 inch or more) NaI(Tl) scintillator 21, a photodetector 22 (a photomultiplier tube, or photodiode), a miniaturized electronics subsystem containing a preamplifier 23 and DCP interface 25, and a source of power 24 such as a battery pack to provide electrical energy to the electronics.

The total counts for each time period are then formatted by an interface electronics package and converted to a data stream suitable for modulation of the radio frequency (Rf) transmitter. This electronics system, due to its small size and low power requirements, would be suitable for remote, battery operated application as described by this invention.

One method for making the attenuation measurement for the Soil Moisture probe would be to measure the temperature corrected D.C. output voltages (DCP_OUT) of both the buried Field Detectors and the above ground Reference Detector of FIG. 1, and to then take the ratio of these two readings on a channel-by-channel basis. Another method for this attenuation measurement would be to apply the MCA_OUT signal for each detector to a Multichannel Analyzer (MCA) apparatus that is capable of measuring the particle energy spectrum range of interest, provided by the detector, as shown in FIG. 5. The present method requires one or more MCA cards and a computer at the measurement site. In remote locations, however, the equipment necessarily would be operated by batteries. For such sites, the use of the D.C. voltage signals (DCP_OUT), referred to in FIG. 2, is viewed by the Applicant as a best mode.

In order to obtain the desired information, spectra were recorded and collected continuously by each detector over 3 hour intervals. The information was summed, averaged, and stored as a text file, and a new set of spectral data initiated. Data was taken in this fashion for 5 days to obtain background readings. On day 5, the area around the buried sensors was watered for about 6 hours. Data was taken for another 4 days to determine the response of the soil to this watering event. The entire 9 days of data for this site is shown below in FIG. 6. One should note that the specific times and intervals used in the present measurements are to be understood as illustrative only, and should not be construed as limiting. Many other times and ranges are possible.

Figure 6:
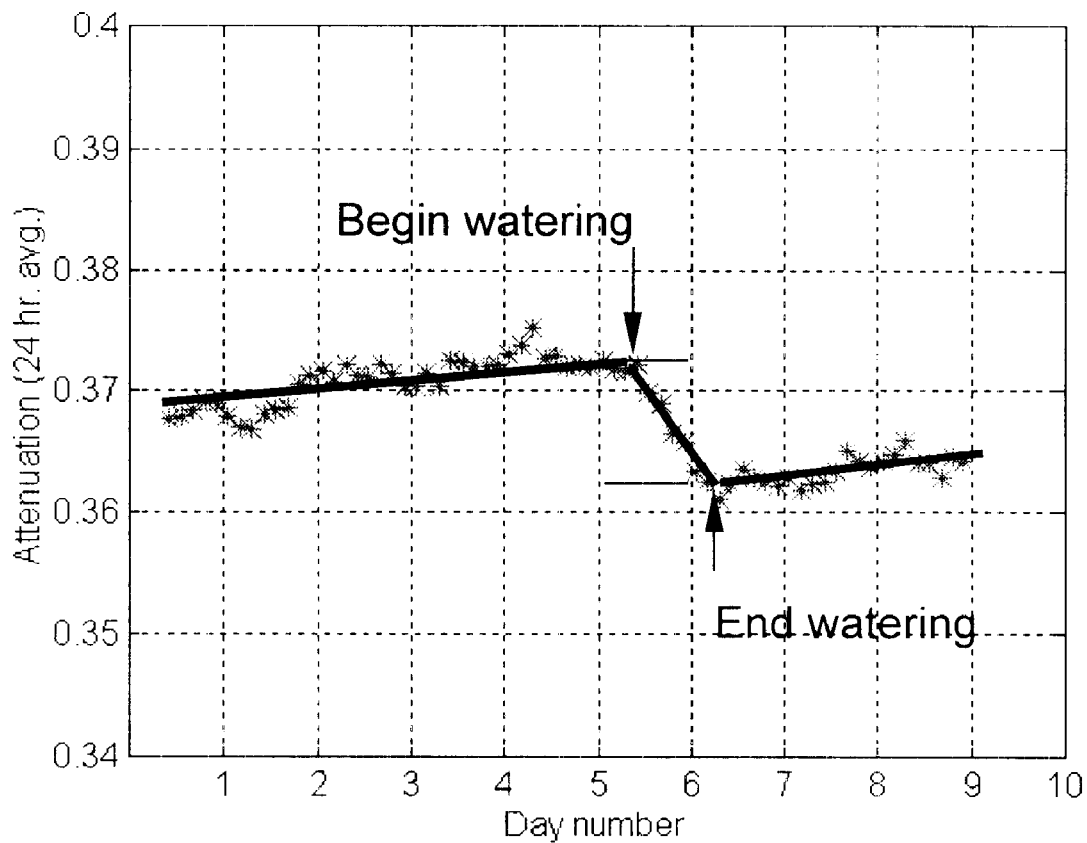
FIG. 6 shows the attenuation response curve of the detector taken with the present method before and after applying about 6" of water to a area of soil above a scintillation detector buried at a depth of five feet.

Each data point thus depicted in FIG. 6 is the average of the previous 24 hours of data (8 sets of 3 hour spectra). Watering at the sensor site began at the point indicated by the first arrow shown in FIG. 6. A total of about 6" inches of water was applied to the site over a period of about 6 hours. Although there is some scatter in the data of FIG. 6, a pattern in the data is clearly recognizable and is indicated by the 3 straight lines drawn through the three distinct zone of the figure. The upward trend of the first and last line segments of the FIGURE suggest a continuous, albeit slow, loss of moisture in the soil, except during the period when water was being applied to the site. If, for example, the arrow of FIG. 6 were to represent the start of an irrigation cycle, the rate at which water is lost between days 5 and 9 in FIG. 6 above could be used to predict when the next period of irrigation would be needed. Furthermore, if core samples of the soil at the monitored site are taken under various soil moisture conditions, then an absolute calibration could be made between the attenuation readings of FIG. 6 and soil moisture.

Although a preferred embodiment of the present invention has been described, the spirit and scope of the invention is by no means restricted to what is described above. For example, within the general framework of the description given above, any other similar type of particle detector may be substituted for the preferred NaI(Tl) scintillator, as long as such a detector accomplishes the general purpose of detecting secondary cosmic radiation in the range of between about 5 MeV and 15 MeV. Furthermore, because the system described herein relies on relative measurements, by properly setting a comparison threshold measure it is possible to initiate an electrical signal or "trigger" and relay that signal to simple industrial control/actuator electronics to automatically turn irrigation pumps on and off when the detector signal falls below or rises above the preset threshold.

What is claimed is:

1. A method for providing a relative measurement of moisture contained in a layer of soil, comprising:
   a) providing radiation sensitive detectors at known distances below a surface of said soil;
   b.) measuring a flux of secondary cosmic rays with said radiation sensitive detectors to provide a baseline flux measurement, wherein said flux is attenuated by said soil;
   c.) measuring a change in said baseline flux measurement as a quantity of water is applied onto an area of said soil surface above said radiation sensitive detectors, said change providing a flux difference proportional to said quantity of water applied to said soil; and
   d.) providing a reference radiation sensitive detector at or near said soil surface for providing a measurement of an unattenuated flux of secondary cosmic rays, wherein said unattenuated flux is obstructed only by atmospheric air.

2. The method of claim 1, wherein said attenuated flux is normalized by providing a simultaneous ratio of said attenuated flux divided by said unattenuated flux.

3. The method of claim 1, wherein said detectors comprise a two dimensional array of detectors distributed across a field and wherein each of said detectors is located at the same distance below said soil surface.

4. The method of claim 1, wherein said detectors comprise a three dimensional array of detectors distributed across a field, said three dimensional array comprising a plurality of in-line columns of 2 or more detectors wherein each detector in each column is located at the same distance below the soil surface as each corresponding detector in every other column, and wherein said plurality of in-line columns are arranged in a two dimensional array across said field.

5. A system for monitoring irrigation in a cultivated field to prevent water waste, comprising:
   a) a radiation detector for continuously measuring an attenuated flux of secondary cosmic rays, said radiation detector located at a known distance below a surface of said cultivated field,
   b) signal means in electrical communication with said radiation detector and an actuator means, said signal means for sending an electronic signal to set an actuator ON state when said attenuated flux raises above a preset level and to set an actuator OFF state when said attenuated flux falls below a preset level
   c.) actuator means in communication with a water pump;
   d.) means for providing power to said detector to said signal means, said actuator means and said water pump.

* * * * *